(12) United States Patent
Jackson et al.

(10) Patent No.: US 8,612,526 B2
(45) Date of Patent: Dec. 17, 2013

(54) SYSTEM AND METHOD FOR PRIORITIZING MESSAGE TRANSCRIPTIONS

(75) Inventors: James Jackson, Austin, TX (US); Philip Cunetto, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 457 days.

(21) Appl. No.: 12/840,910

(22) Filed: Jul. 21, 2010

(65) Prior Publication Data

US 2012/0023173 A1    Jan. 26, 2012

(51) Int. Cl.
*G06F 15/16*     (2006.01)

(52) U.S. Cl.
USPC .......................................... 709/206; 709/204

(58) Field of Classification Search
USPC ................................. 709/204, 206
See application file for complete search history.

(56) References Cited

U.S. PATENT DOCUMENTS

| | | | |
|---|---|---|---|
| 6,580,786 B1 * | 6/2003 | Yarlagadda | 379/88.17 |
| 6,816,858 B1 | 11/2004 | Coden et al. | |
| 7,024,455 B2 * | 4/2006 | Yokobori et al. | 709/204 |
| 8,019,051 B1 * | 9/2011 | Childs et al. | 379/67.1 |
| 2002/0029189 A1 * | 3/2002 | Titus et al. | 705/39 |
| 2002/0132611 A1 * | 9/2002 | Immonen et al. | 455/414 |
| 2003/0236845 A1 * | 12/2003 | Pitsos | 709/206 |
| 2004/0083270 A1 * | 4/2004 | Heckerman et al. | 709/207 |
| 2004/0248563 A1 * | 12/2004 | Ayers et al. | 455/417 |
| 2006/0030297 A1 * | 2/2006 | Coble et al. | 455/412.1 |
| 2006/0031364 A1 * | 2/2006 | Hamilton et al. | 709/206 |
| 2006/0080354 A1 * | 4/2006 | Berger et al. | 707/103 R |
| 2006/0195540 A1 * | 8/2006 | Hamilton et al. | 709/206 |
| 2006/0239188 A1 * | 10/2006 | Weiss et al. | 370/229 |
| 2007/0189520 A1 * | 8/2007 | Altberg et al. | 380/30 |
| 2007/0230476 A1 * | 10/2007 | Ding | 370/394 |
| 2007/0287463 A1 * | 12/2007 | Wilson | 455/445 |
| 2008/0034086 A1 * | 2/2008 | Castelli et al. | 709/224 |
| 2008/0147864 A1 * | 6/2008 | Drogo De Iacovo et al. | 709/226 |
| 2009/0010202 A1 * | 1/2009 | Masayuki et al. | 370/328 |
| 2009/0061828 A1 * | 3/2009 | Sigmund et al. | 455/413 |

(Continued)

FOREIGN PATENT DOCUMENTS

| | | | |
|---|---|---|---|
| EP | 1104964 A1 * | 6/2001 | |
| EP | 1696651 A1 * | 8/2006 | |

(Continued)

OTHER PUBLICATIONS

U.S. Appl. No. 12/841,830, Yasrebi et al., filed Jul. 22, 2010.

*Primary Examiner* — Kostas Katsikis

(57) ABSTRACT

Systems, methods, and computer-readable storage media for managing transcription resources. A system practicing the method retrieves a class of service for a subscriber recipient of a message deposited at a first server for transcription by a second server, determines a probability of near-term access of the message by the subscriber, assigns a weight to the message based on the class of service and the probability of the near-term access, and transcribes, at the second server, the message based on the weight. Classes of service can include a real-time class of service and/or one or more non-real-time class of service. The probability of near-term access can be based on subscriber presence, subscriber receipt of a new message notification, historical statistics of subscriber message access times, message urgency, and other message metadata. A channel manager can manage a finite number of channels between the first and second servers.

20 Claims, 4 Drawing Sheets

(56) References Cited

U.S. PATENT DOCUMENTS

| | | |
|---|---|---|
| 2009/0086278 A1* | 4/2009 | Vendrow et al. ............. 358/402 |
| 2009/0164588 A1* | 6/2009 | D'Amato et al. ............. 709/206 |
| 2009/0164933 A1 | 6/2009 | Pederson et al. |
| 2010/0057880 A1* | 3/2010 | Hasti et al. .................... 709/207 |
| 2010/0125450 A1 | 5/2010 | Michaelangelo et al. |
| 2010/0146057 A1* | 6/2010 | Abu-Hakima et al. ....... 709/206 |
| 2010/0150322 A1 | 6/2010 | Yin et al. |
| 2010/0185746 A1* | 7/2010 | Suh et al. ...................... 709/217 |
| 2012/0278160 A1* | 11/2012 | Ieong et al. ................ 705/14.43 |

FOREIGN PATENT DOCUMENTS

| | | | |
|---|---|---|---|
| JP | 02069043 A | * | 3/1990 |
| JP | 09046421 A | * | 2/1997 |
| JP | 2009245374 A | * | 10/2009 |
| WO | WO 9719525 A1 | * | 5/1997 |

* cited by examiner

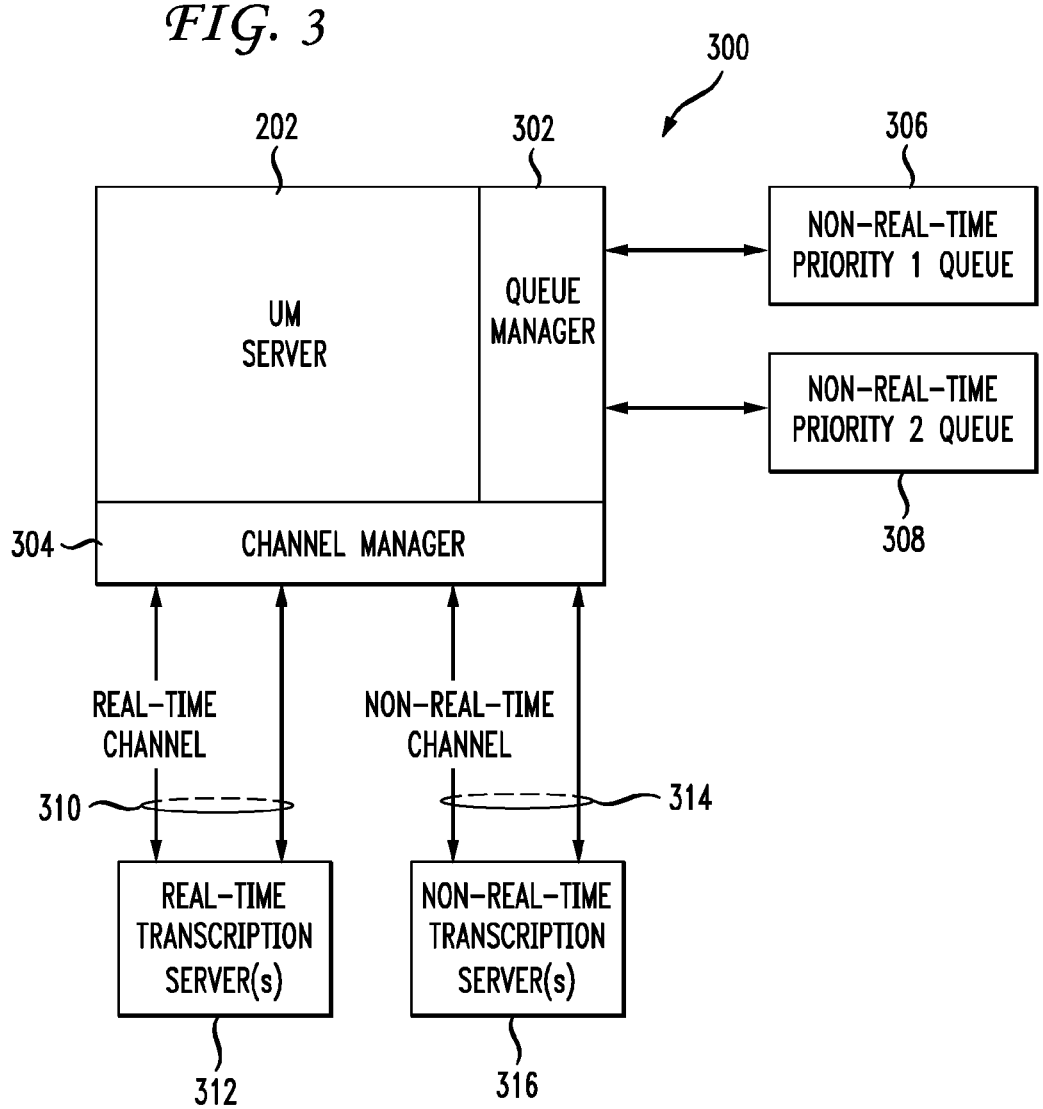

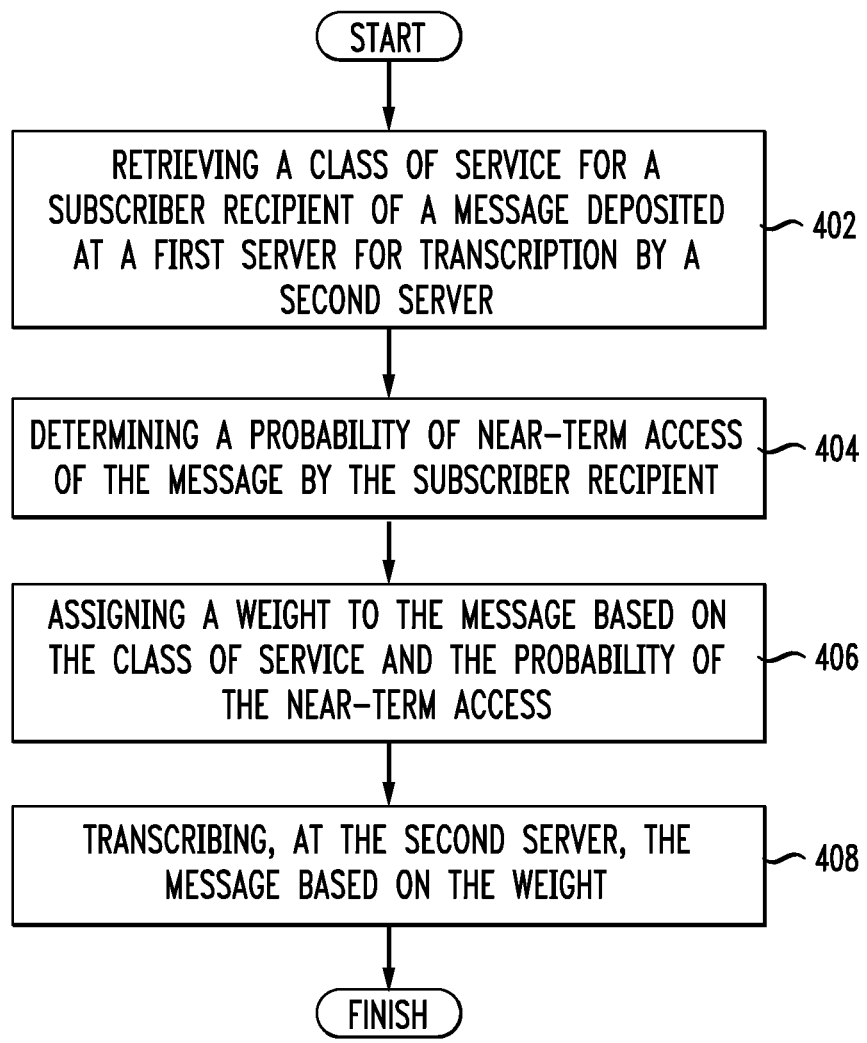

SYSTEM AND METHOD FOR PRIORITIZING MESSAGE TRANSCRIPTIONS

BACKGROUND

1. Technical Field

The present disclosure relates to unified messaging and more specifically to prioritizing transcriptions for message, such as a voicemail, in a unified messaging system.

2. Introduction

Unified messaging (UM) is an approach to integrate messages which are created, transmitted, and stored in different communication media into a single interface which is accessible from a wide array of devices. For example, a unified messaging interface can be accessible via desktop or laptop computer, a web interface, smart phone, cellular phone, landline phone, and so forth. A UM server can pass transcribable messages, such as voicemail, video mail, images, and other audiovisual messages to a transcription server for transcription.

Message transcription is a very resource intensive process, requiring a significant amount of processing power and memory. Some UM subscribers access their messages very quickly and others wait for an extended period of time to access their messages. One solution to solve this problem is to devote additional resources to transcription, such as purchasing more or faster memory, processors, bandwidth, or even additional transcription servers. However, this approach may not be feasible due to high cost. Further, this approach wastes computing resources during low-demand periods.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A unified messaging server communicates with a transcription server or collection of transcription servers via a finite number of channels. One aspect of this approach involves the management of these channels. Disclosed are systems, methods, and non-transitory computer-readable storage media for managing transcription resources. A system configured to practice the method first retrieves a class of service for a subscriber recipient of a message deposited at a first server for transcription by a second server, determines a probability of near-term access of the message by the subscriber recipient, assigns a weight to the message based on the class of service and the probability of the near-term access, and transcribes, at the second server, the message based on the weight. In one example, the first server is a unified messaging server and the second server is a transcription server. Either of these servers can be a single computing device or a group of computing devices.

A channel manager can manage the limited number of channels between the first server and the second server. The channel manager can reserve a first portion of the finite number of channels for real-time transcription and a second portion of the finite number of channels for non-real-time transcription. The channel manager and/or the UM server can overflow excess transcriptions between the first portion and the second portion as needed.

A queue manager can place non-real-time class messages in one or more transcription queues based on a class of service, probability of near-term message access, and feedback from a transcription event handler. The queues can be located in the UM server, in the queue manager, in one or more transcription servers, and/or a location external to all of these. The queue manager can assign messages to an initial queue, reassign messages to another queue, and remove messages from a queue.

After the transcription server transcribes the messages, the UM server and/or the transcription server can then relay the transcribed messages to an appropriate UM client or UM clients or store the transcribed messages for later retrieval. All or part of the transcription server and the UM server can operate within the same physical device or be separate, and/or located in different geographic locations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an example UM server with a channel manager and a queue manager; and FIG. 4 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for prioritizing transcriptions in a unified messaging system. A system, method and non-transitory computer-readable media are disclosed which prioritize and/or manage transcription resources by transcribing messages in different channels based on a message and/or subscriber class of service and a probability of near-term access of the message by the subscriber. In one aspect, the principles disclosed herein function as part of a unified messaging system. A brief introductory description of a basic general purpose system or computing device in FIG. 1 which can be employed to practice the concepts is disclosed herein. A more detailed description of methods and graphical interfaces will then follow. The disclosure now turns to FIG. 1.

Figure 1:
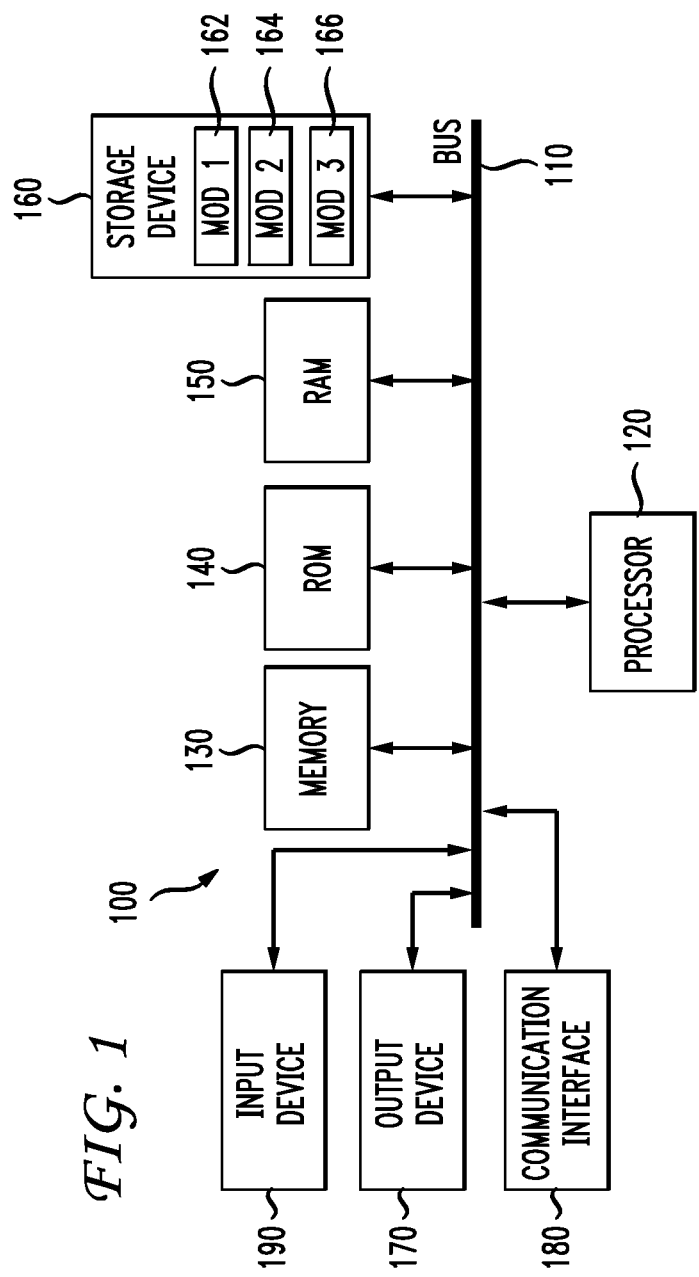
FIG. 1 illustrates an example system embodiment.

With reference to FIG. 1, an exemplary system, or general-purpose computing device, 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
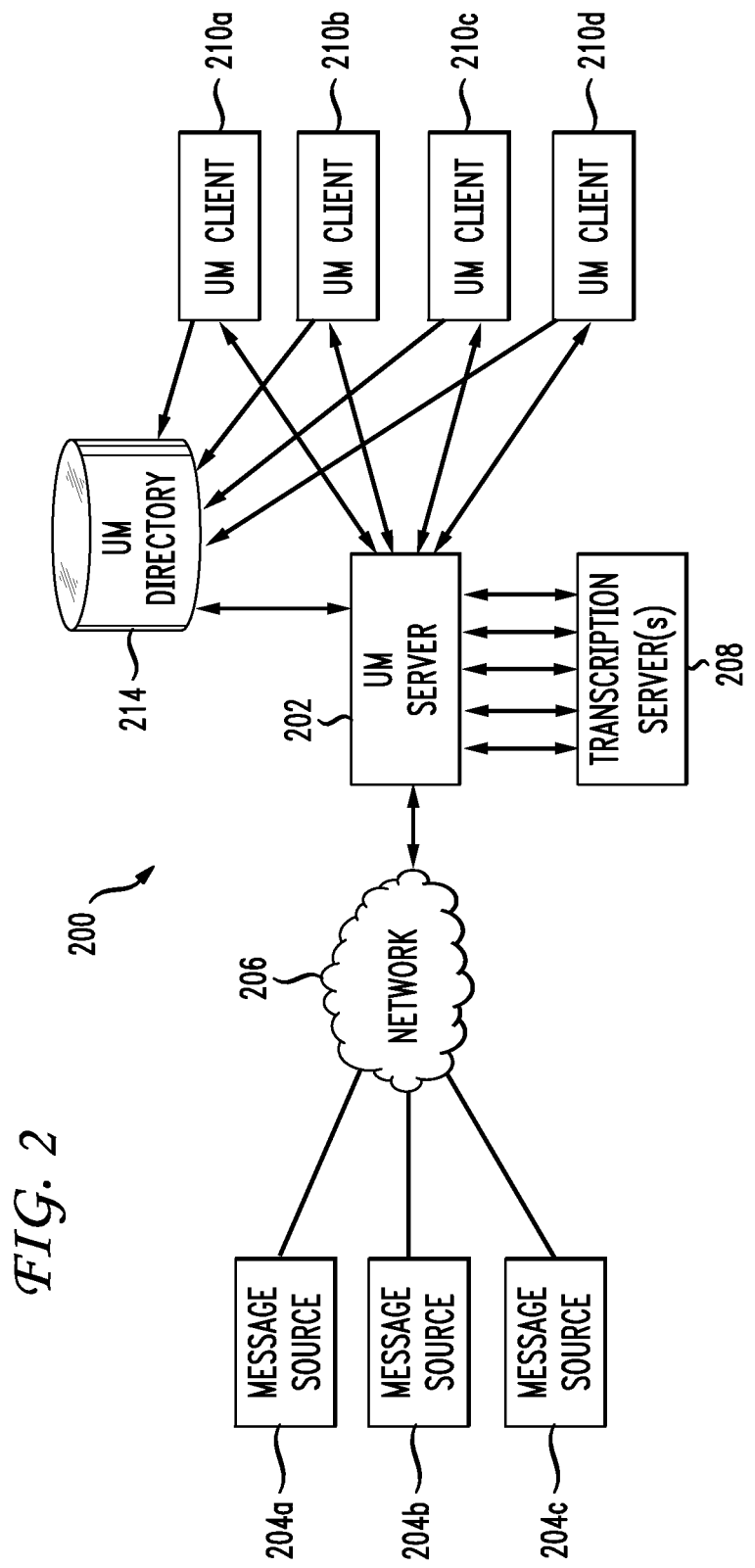
FIG. 2 illustrates an example unified messaging (UM) server and UM client configuration.

The disclosure now turns to FIG. 2 which illustrates an example overview 200 of a unified messaging (UM) server 202 and UM client 210a,b,c,d configuration. The UM server 202 and/or UM clients 210a,b,c,d can include all or part of the elements of the exemplary system 100 shown in FIG. 1. The UM server 202 receives messages from multiple message sources 204a, 204b, 204c via a communication network 206, such as the public switched telephone network or the Internet. The message sources can provide message such as voicemails, video messages, facsimiles (faxes), images, multimedia messages, and/or hyperlinks.

When the UM server 202 receives messages, the UM server 202 can identify a recipient of the message and retrieve a subscriber profile from a UM directory 214. The subscriber profile can provide information about a class of service for the subscriber. For example, one subscriber can pay a premium fee for real-time transcription service, another subscriber can pay a lower fee for a first non-real-time transcription service that indicates a preference for a short transcription time, but the short time is not guaranteed, and a third subscriber can use a second non-real-time transcription service for free that has no preference for a transcription delay. Real-time transcriptions can be streamed to the transcription server as they are received. While waiting to be transcribed, non-real-time transcriptions can be deposited in a queue internal to the UM server 202, a queue internal to the transcription server(s) 208, and/or a queue external to both the UM server 202 and the transcription server(s) 208. In one case, multiple non-real-time queues can distinguish between different classes of non-real-time transcriptions.

The UM directory 214 can store additional classes of service beyond the exemplary classes of service discussed herein. In one aspect, a hybrid class of service provides a different class of service based on time, location, subscription, date, and other user parameters. For example, a hybrid class of service for an accountant may indicate a real-time class of service on weekdays which are not federal holidays between 8:00 a.m. and 6:30 p.m. and a no-preference class of service all other times. In another example, a salesman can indicate that all incoming messages from phone numbers or emails originating from a group of client companies are associated with a real-time transcription class of service and all other messages are associated with a class of service which prefers but does not require a short transcription time. Other variations and classes of service can be applied.

In one aspect, the UM directory 214 also provides information to the UM server 202 related to the probability of messages being accessed in the near term. If the user receives and accesses a new message notification while the message transcription is pending, the UM server 202 can increase the probability that the message will be accessed in the near term. If the user receives the new message notification but does not access the message, the UM server 202 can lower the probability or leave it unchanged. The probability of near-term access can be based on historical statistics for subscriber message/transcription access times, such as the average time between new message notification and transcription access. The average time can be per-user for a very granular average or can be averaged for similar customers. For example, the average time between new message notification and transcription access can be calculated for males from ages 18-25 in Florida, for Asian females in the Rocky Mountains, or for college students nationwide.

The probability of near-term access can further be based on subscriber presence information. Presence information can convey a user's available capacities to communicate. For example, presence can indicate whether a user is available or not, whether a user can accept a video feed or not, the user's physical location, which specific communication devices the user has available, and so forth. Presence can also indicate a user's willingness to accept communications. For example, a user presence can indicate "do not disturb", "in a meeting", or "available". Presence information can be automatically generated or manually set by the user. In one configuration, the UM directory 214 receives subscriber presence information from UM clients 210a,b,c,d and bases the probability of messages being accessed in the near term on that presence information. Presence information can be gleaned from one source or from multiple sources, such as web browser logins, smartphone applications, GPS signals, calendar events, and so forth.

Other factors which can be relevant to the probability of near-term access can include message parameters, such as indicators of message urgency, and message meta-data, such as a message source or message title. The UM server 202 can also dedicate more resources to subscribers that have historically received higher confidence transcriptions.

The UM server 202 communicates with a transcription server 208 or servers which transcribe all or part of each message from the message sources via a finite number of communication channels 212. The finite number of communication channels can be divided into multiple groups. For example, a first group of communication channels associated with a first group of transcription servers can handle real-time transcriptions and a second group of communication channels associated with a second group of transcription servers can handle non-real-time transcriptions. The transcription server 208 can transcribe messages using speech to text, OCR, pattern recognition, and/or any other suitable mechanism(s) to extract text from non-textually formatted messages. The transcription server 208 can also perform translation services to translate extracted text from one language to another, if needed. The UM server 202 can then offer an original language transcription and a translated transcription to the UM client. The UM server 202 identifies a particular UM client 210a,b,c,d for each message and transmits information to the respective UM client regarding the message, including a transcription status. In the case of a voicemail, the UM server 202 can transmit information indicating a sender of the voicemail, a duration of the voicemail, a callback number, a time of the voicemail, a "headline" of the voicemail transcription.

FIG. 3 illustrates a more detailed example configuration 300 of a UM server 202, multiple transcription servers 312, 316, a channel manager 304, and a queue manager 302. The transcription servers can be dedicated physical machines or virtual machines. In one variation, a "server" is a subset of a physical machine. For example, a single core of a server having multiple CPU cores can serve as a real-time transcription server, while the remaining cores serve as non-real-time transcription servers. In another variation, multiple separate processors and/or computers may be used to implement a UM server 202. The UM server 202 communicates with a channel manager which manages the communication channels 310, 314 between the UM server 202 and the transcription servers 312, 316. One or more real-time communication channel 310 connect the UM server 202 with real-time transcription server(s) 312. In one aspect, there is no real-time queue because the UM server 202 immediately or substantially immediately streams transcriptions having a real-time class of service via the channel manager 304 and the real-time channel 310 to the real-time transcription server 312.

In one variation, the channel manager 304 is responsible for managing the finite number of channels 310, 314 between the UM server 202 and the transcription servers 312, 316. The number of channels can be limited to available CPU power, network bandwidth, memory, storage, and/or other individual or shared computing resources.

For messages which do not have a real-time class of service, the UM server 202 places the messages to be transcribed in a queue via a queue manager 302. In one embodiment, multiple queues 306, 308 receive and hold messages. In this example, a first non-real-time priority queue 306 and a second non-real-time priority queue 308 receive messages from the queue manager 302. The queues can be incorporated in the UM server 202, a transcription server 316, and/or can be separate from either. In one case, multiple associated queues serve as a single queue. For example, a transcription server 316 can include a short queue of 10 messages, while the UM server 202 includes an associated overflow queue for storing messages beyond the 10 in the short queue. In one aspect, the queues are located in between the UM server 202 and the transcription servers 312, 316.

Non-real-time transcription demand may exceed the capacity of the non-real-time transcription servers 316 while the real-time transcription servers 312 are idle or otherwise under-utilized. In this situation, the UM server 202 can control overflow transcriptions from non-real-time transcription servers 316 to the real-time transcription servers 312. Conversely, when the real-time transcription server 312 is at capacity and cannot transcribe incoming real-time class messages in real time, the UM server 202 can control overflow transcriptions from the real-time transcription server 316 to the non-real-time transcription server 316 by preempting non-real-time transcriptions.

The queue manager 302 can perform initial queue assignment, queue re-assignment, message removal, and so forth. The queue manager 302 can implement a queuing scheme in response to congestion of real-time and/or non-real-time channels 310, 314. The queuing scheme can utilize a variety of different queuing algorithms such as priority queuing and/or class-based weight fair queuing. As an example, the non-real-time channel 314 can service a high priority queue, a medium priority queue, and a low priority queue. The queue manager 302 can use the subscriber transcription class-of-service, historical statistics, message parameters, and/or input from a transcription event handler, to determine queue assignment.

Typically the UM server 202 performs transcription prioritization as described herein, but all or a portion of the steps can be performed by other components as well. For example, a separate queuing module, not shown, can queue non-real-time messages and pass real-time messages from the UM server 202 immediately to a real-time transcription server 312.

Having disclosed some basic system components, the disclosure now turns to the exemplary method embodiment for managing transcription resources shown in FIG. 4. For the sake of clarity, the method is discussed in terms of an exemplary system 100, as shown in FIG. 1, configured to practice the method. The system 100 retrieves a class of service for a subscriber recipient of a message deposited at a first server for transcription by a second server (402). The system 100 can retrieve the class of service from a centralized or distributed profile server, directly from a recipient device, the message, message metadata, a message sender, and so forth. One exemplary embodiment includes three classes of service: a real-time class of service, a first non-real-time class of service with a preference (but not a guarantee) for a short transcription delay, and a second non-real-time class of service with no preference for transcription delay. Other numbers and types of classes of service can be used. For example, the system 100 can include a guaranteed real-time class of service and a best-effort real-time class of service. In one aspect, the first server and the second server are separate physical machines, such as a unified messaging server and a transcription server. In another aspect, the first server and the second server are contained within a single physical machine. For example, the first server and second server can be separate processes or threads running on a single computer.

The system 100 determines a probability of near-term access of the message by the subscriber recipient (404). The system 100 can determine the probability of near-term access of the message by evaluating multiple data points, such as subscriber presence, receipt of a new message notification by the subscriber, historical statistics of subscriber message access times, message urgency, message parameters, and other message metadata. The system 100 can determine multiple probabilities for different values of "near-term". For example, near-term can mean within 5 seconds, 30 seconds, 1 minute, or 10 minutes. "Near-term" can be a preset global duration for all users, or different based on time of day, usage history, and/or user preferences.

The system 100 assigns a weight to the message based on the class of service and the probability of the near-term access (406) and transcribes, at the second server, the message based on the weight (408). In one variation, the assigned weight can be used to govern where to insert a non-real-time message into a transcription queue. The queue can be a priority queue where higher priority messages are transcribed before lower priority messages, a first-in, first-out queue, or other type of queue.

In almost every instance, the number of channels between the UM server and the transcription server is finite and is typically based on computing ability of the transcription server. The UM server can access the resources of the transcription server by issuing an application programming interface (API) call to the transcription server. In this way, the UM server treats the transcription server as a "black box" and may have no direct access to the resources of the transcription server. A channel manager can manage the finite number of channels. The channel manager can reserve different portions of the channels for various purposes. For example, one reserved portion of the channels can service messages in a particular class of service. The channel manager can redirect messages which overflow from one channel to another channel or reallocate resources from an underutilized channel to a channel that needs more resources.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can enhance existing unified messaging platforms by reducing the cost of hardware required for message transcription, improving customer experience, providing enhanced service for premium customers, and prioritizing messages that are more likely to be accessed in the near-term. Further, this approach more gracefully addresses periods of overload and/or transcription service disruption. Those skilled in the art will readily recognize various modifications and changes that may be made to the principles described herein without following the example embodiments and applications illustrated and described herein, and without departing from the spirit and scope of the disclosure.

We claim:

1. A method comprising:
    retrieving a class of service of a message deposited at a first server for transcription by a second server, wherein the class of service is based on a subscriber class of a recipient of the message;
    calculating, using historical statistics, an average time between reception of a new message and transcription access;
    determining a probability of access of the message by the recipient within a time period smaller than the average time;
    assigning a weight to the message based on the class of service and the probability of access; and
    transcribing, at the second server, the message based on the weight.

2. The method of claim 1, wherein the class of service is one of real-time transcription and non-real time transcription.

3. The method of claim 2, wherein the non-real time transcription class of service is one of a preference for short wait time and no preference.

4. The method of claim 1, wherein determining the probability of access is based on one of recipient presence, receipt of a new message notification by the recipient, message urgency, message parameters, and other message metadata.

5. The method of claim 1, further comprising, via a channel manager, managing a finite number of channels between the first server and the second server.

6. The method of claim 5, wherein the channel manager reserves a first portion of the finite number of channels for real-time transcription and a second portion of the finite number of channels for non-real-time transcription.

7. The method of claim 6, wherein excess transcriptions overflow in one of the following ways: from the first portion to the second portion and from the second portion to the first portion.

8. The method of claim 1, further comprising, via a queue manager, placing the message in a transcription queue based on one of the class of service, the probability of access, and feedback from a transcription event handler.

9. The method of claim 8, wherein the queue manager performs one of initial queue assignment, queue reassignment, and message removal from queue.

10. The method of claim 1, wherein the second server is remote from the first server.

11. The method of claim 1, wherein the first server and the second server are a single server.

12. A system comprising:
    a processor; and
    a computer-readable storage medium having instructions stored which, when executed by the processor, cause the processor to perform operations comprising:
        retrieving a class of service of a message deposited at a first server for transcription by a second server, wherein the class of service is based on a subscriber class of a recipient of the message;
        calculating, using historical statistics, an average time between reception of a new message and transcription access;
        determining a probability of access of the message by the recipient within a time period smaller than the average time;
        assigning a weight to the message based on the class of service and the probability of access; and
        transcribing, at the second server, the message based on the weight.

13. The system of claim 12, wherein the class of service is one of real-time transcription and non-real time transcription.

14. The system of claim 13, wherein the non-real time transcription class of service is one of a preference for short wait time and no preference.

15. The system of claim 12, wherein determining the probability of access is further based on one of recipient presence, receipt of a new message notification by the recipient, message urgency, message parameters, and other message metadata.

16. A computer-readable storage device having instructions stored which, when executed by a computing device, cause the computing device to perform operations comprising:
    retrieving a class of service of a message deposited at a first server for transcription by a second server, wherein the class of service is based on a subscriber class of a recipient of the message;
    calculating, using historical statistics, an average time between reception of a new message and transcription access;
    determining a probability of access of the message by the recipient within a time period smaller than the average time;
    assigning a weight to the message based on the class of service and the probability of access; and
    transcribing, at the second server, the message based on the weight.

17. The computer-readable storage device of claim 16, the computer-readable storage device having additional instructions stored which result in further operations comprising, via a channel manager, managing a finite number of channels between the first server and the second server.

18. The computer-readable storage device of claim 17, wherein the channel manager reserves a first portion of the finite number of channels for real-time transcription and a second portion of the finite number of channels for non-real-time transcription.

19. The computer-readable storage device of claim 18, wherein excess transcriptions overflow in one of the following ways: from the first portion to the second portion and from the second portion to the first portion.

20. The computer-readable storage device medium of claim 16, the computer-readable storage device having additional instructions stored which result in further operations comprising, via a queue manager, placing the message in a transcription queue based on one of the class of service, the probability of access, and feedback from a transcription event handler.

* * * * *